May 6, 1952 G. W. CURTIS 2,595,229
TRACTOR DRIVE AND CONTROL MECHANISM
Filed Aug. 17, 1946 4 Sheets-Sheet 1

INVENTOR.
George W. Curtis
BY
Morsell & Morsell
ATTORNEYS.

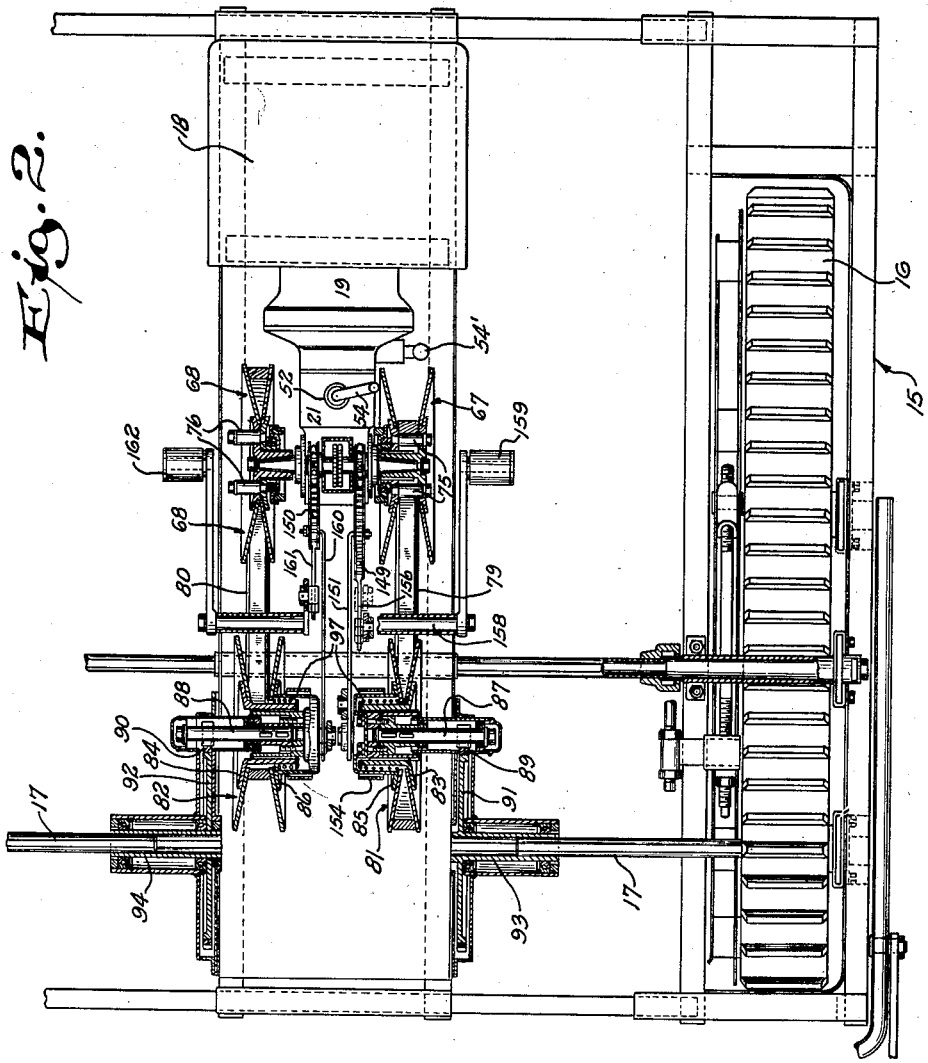

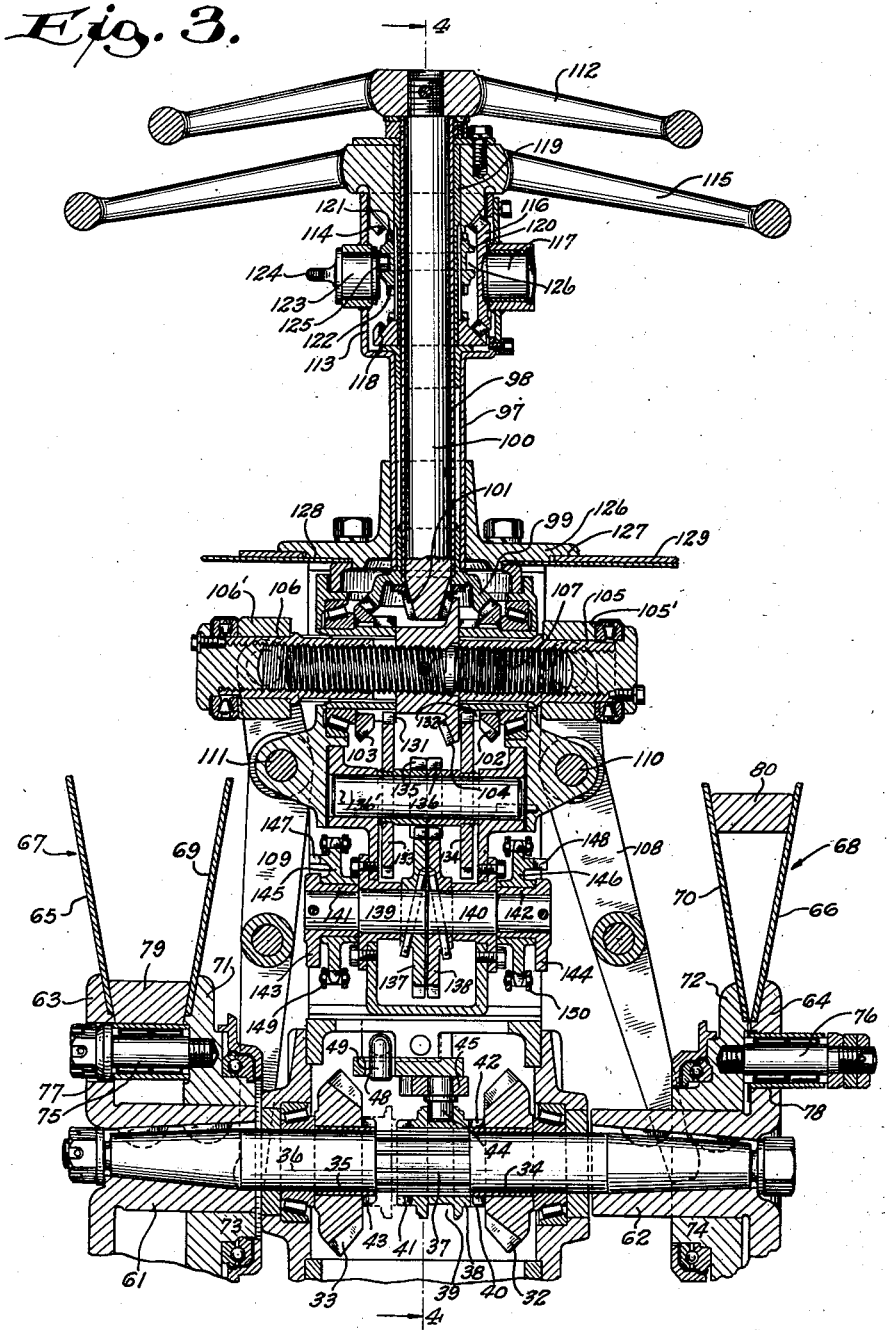

May 6, 1952 G. W. CURTIS 2,595,229
TRACTOR DRIVE AND CONTROL MECHANISM
Filed Aug. 17, 1946 4 Sheets-Sheet 4

INVENTOR.
George W. Curtis
BY
Morsell & Morsell
ATTORNEYS.

Patented May 6, 1952

2,595,229

UNITED STATES PATENT OFFICE 2,595,229

TRACTOR DRIVE AND CONTROL MECHANISM

George W. Curtis, Milwaukee, Wis.

Application August 17, 1946, Serial No. 691,272

15 Claims. (Cl. 74—710.5)

This invention relates to improvements in tractors and is a continuation-in-part of application, Serial No. 610,538, filed August 13, 1945, now Patent No. 2,529,489.

Certain farm tractor tillage operations, such as plowing or disking, create a heavy draw bar pull which must be overcome by high tractive effort. Such effort causes high torque reactions in the final drive gears of the tractor and creates a tendency to lift the front end of the tractor off of the ground and turn it over backwards. Many fatal accidents have resulted from this cause.

Because of the above, proper tractor design requires the location of the center of gravity a substantial distance forwardly of the driving axles. In order to accomplish this purpose, it is universal practice to place the engine, which is the heaviest concentration of weight in any part of the tractor, at the front end. In many tractors an engine so located is directly over the front wheels and high above the ground. This is objectionable because it interferes with the vision of the operator in a forward direction and is thus a handicap when operating front implements such as row crop cultivators, mowers, and corn pickers.

In general purpose tractors where the wheels are directly under the engine, there is a definite limitation as to the carrying of any additional front end loads because it is not always possible to use larger front wheels which would be needed if such additional loads were carried. Thus, in many tractors it is not practical to carry front mounted implements such as tractor sweep rakes, manure loaders and the like. It is thus apparent that general purpose tractors as heretofore provided, are objectionable not only because of the interference with forward vision, but also because of the low front end capacity.

Because of the above situation, a number of new designs of self-propelled combines and cotton pickers are essentially tractors operating in a backward direction. While farm operations of unusual size may justify the expense of such special machinery, nevertheless, a small farmer cannot afford such extra equipment and it is, therefore, desirable to furnish him with a general purpose tractor which overcomes all of the objectionable features above mentioned.

It is, therefore, a general object of the present invention to provide a tractor which may be operated efficiently and with ease in either direction.

A more specific object of the invention is to provide a tractor which has the same range of speeds in both directions.

A further object of the invention is to provide in a tractor as above described, having an operator's seat which is reversible in position and having speed controls, steering controls and brake controls which are operable from either position of the seat for controlling the tractor in either direction of movement.

With the above and other objects in view, the invention consists of the improved tractor, and all of its parts and combinations, as set forth in the claims, and all equivalents thereof.

In the accompanying drawings, illustrating one complete embodiment of the preferred form of the invention, in which the same reference numerals designate the same parts in all of the views, Fig. 1 is a side elevational view of the tractor showing part in vertical longitudinal section, the dot and dash lines indicating an alternate position for the driver's seat;

Fig. 2 is a fragmentary top view of the tractor showing part of the control and transmission mechanism in horizontal section;

Fig. 3 is a fragmentary sectional view taken approximately on the line 3—3 of Fig. 1;

Figure 1:
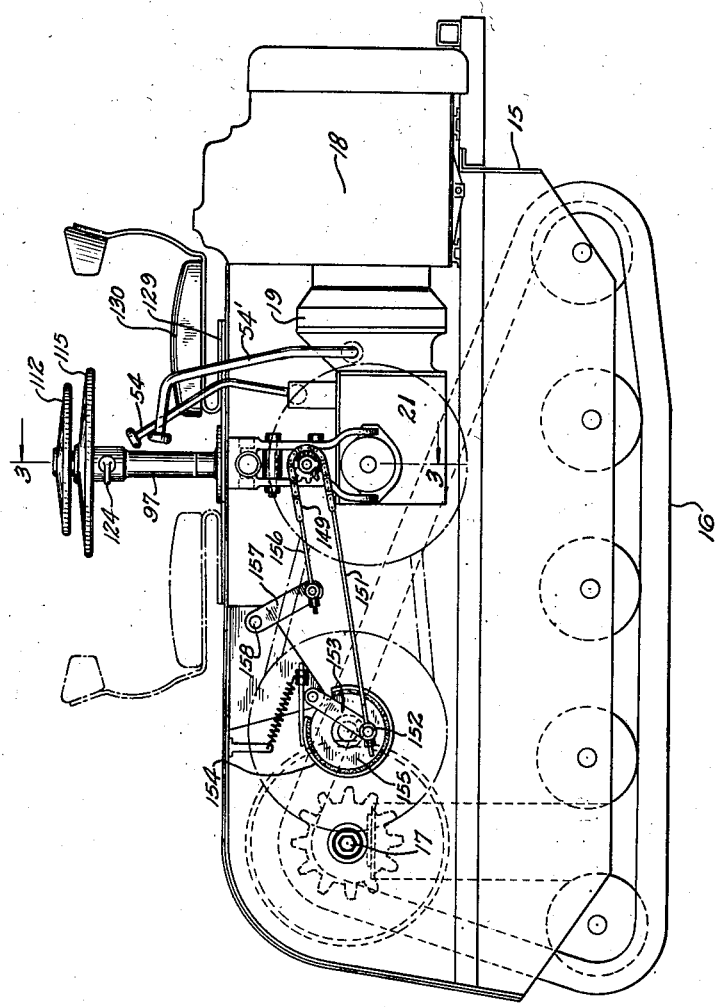

Referring more particularly to the drawing, the numeral 15 designates a tractor having suitable traction members 16, preferably in the form of endless tracklaying devices, driven by shafts 17. At one end of the tractor is an engine unit 18, and projecting into the interior of the body from the engine is a clutch unit 19.

*Clutch and change speed gearing*

Figure 4:
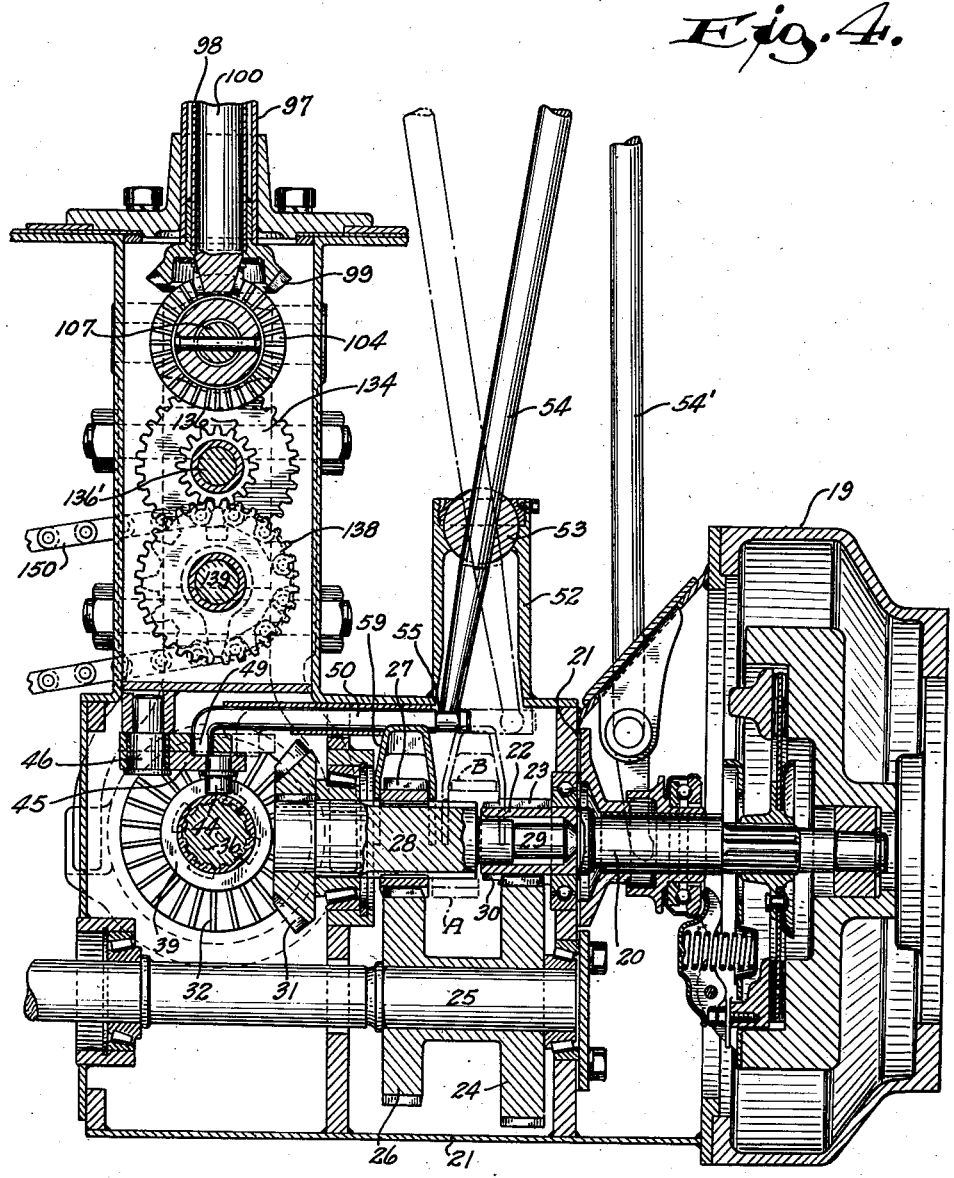
Fig. 4 is a fragmentary sectional view taken approximately on the line 4—4 of Fig. 3.

Referring to Fig. 4, the clutch is preferably a singe dry plate type of conventional design.

The clutch shaft 20 projects into a housing portion 21, and has its projecting end tubular in form, as at 22. Rigidly mounted on said tubular portion is a master pinion 23. The pinion 23 in turn meshes with a gear 24 mounted on a countershaft 25. Integral with the gear 24, but spaced therefrom, is a smaller gear 26. A pinion 27 which has a splined connection with a shaft 28 so as to be slidable thereon is adapted to mesh with the gear 26 when the parts are in the full line position of Fig. 4. The gear 27 is shiftable to the dot and dash line neutral position A of Fig. 4, and also to a position indicated by the dot and dash lines B.

The shaft 28 extends axially of the clutch shaft 20 and has an end portion 29 of reduced diameter which is rotatable within the tubular end 22 of the clutch shaft 20. When the pinion 27 is in the dot and dash line position B of Fig. 4, it will overlap the end of the pinion 23 and engage with projecting splines or teeth 30 to effect a direct connection between the shafts 20 and 28.

It is apparent, therefore, that when the pinion 27 is in the full line position of Fig. 4, in engagement with the gear 26, that the shaft 28 will be driven at a reduced speed, and when the parts are in the dot and dash line position B, the shaft 28 will be driven at the same speed as the shaft 20.

Keyed to the shaft 28 is a bevel gear 31 which meshes with bevel gears 32 and 33 (see Fig. 3). The latter are mounted for free rotation on bushings 34 and 35 surrounding a shaft 36 and tightly fitted thereto. The central portion of the shaft 36 is splined, as at 37, and slidable on said splines is a splined collar 38 having an external peripheral groove 39. The collar has clutch projections 40 at one end and 41 at the opposite end which are engageable respectively with clutch projections 42 and 43 projecting from the bevel gears 32 and 33. If the collar 38 is in the full line position of Fig. 3, then the shaft 36 will be driven by the bevel gear 32 in one direction. If the collar is in the opposite or dot and dash line position of Fig. 3, the shaft 36 will be driven in a reverse direction by the bevel gear 33.

The peripheral groove 39 of the collar is engaged by a shifting pin 44 projecting from a bell crank 45. The latter rotates freely on a pin 46 (see Fig. 4) suitably supported on the transmission housing. One arm of the bell crank lever 45 has a slotted hole 48 (see Fig. 3) which is engaged by the downwardly bent end 49 of a shifting rod 50.

Figure 5:
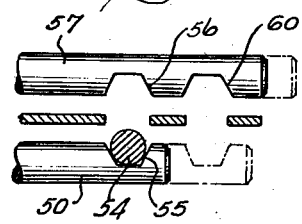
Fig. 5 is a fragmentary horizontal sectional view showing the shifting rods; and, Fig. 6 is an enlarged fragmentary vertical sectional view of the reversing mechanism.

Projecting from the top of the housing portion 21 is a tubular extension 52. A ball 53, rigidly connected to a lever 54, is mounted for universal movement in the upper end of the extension 52. The lower end of the lever 54 is engageable either with a notch 55 of the shifting rod 50 or with notches 56 and 60 of a shifting rod 57 (see Figs. 4 and 5). The shifting rod 57 is rigidly connected with a fork 59 which embraces the pinion 27. The solid lines of Fig. 5 show shifting rod 50 in the position it assumes when the gear 32 is in driving engagement with the shaft 36 of Fig. 3, and show shifting rod 57 in the position it assumes when the pinion 27 is in the neutral or A position of Fig. 4. Thus, the shifting lever 54 may freely enter the notch 56 of rod 57, for the purpose of shifting the pinion 27 into low speed engagement with the gear 26 or into high speed engagement with the teeth 30. The shifting rod 50 may also be shifted while rail 57 is in the neutral full line position of Fig. 5 so that the rod 50 takes the position shown by dot and dash lines in Fig. 5 to bring the gear 33 into driving engagement with the shaft 36 and to bring the notch 55 of the rod 50 in line with the notch 60 of the rod 57. With the rod 50 in this latter position, the lever 54 may enter the notch 60 to likewise shift the pinion 27 into low or high speed engagement. Thus, the rod 57 is free to shift the pinion 27 into either a low or high speed position regardless of the direction of rotation of the shaft 36.

The drive

Keyed to the ends of the shaft 36 are hub members 61 and 62 having flanges 63 and 64 (see Fig. 3). These flanges support metal disks 65 and 66 forming the fixed sides of variable speed sheaves 67 and 68. The other sides 69 and 70 of the sheaves are identical to the sides 65 and 66 but are reversed in position, as is clear from Fig. 3, and are connected to annular flanges 71 and 72 of movable sleeves 73 and 74. The movable sleeves 73 and 74 are guided in axial movement by means of guide rod assemblies 75 and 76 projecting from the flanges 71 and 72 in the movable sleeves and operable through openings 77 and 78 in the fixed flanges 63 and 64.

It is apparent that the disks 65—69 and 66—70 form annular grooves which are substantially V-shaped in cross section for cooperation with endless belts 79 and 80 having tapered side edges.

In line with and spaced longitudinally from the sheaves 67 and 68 are similar sheaves 81 and 82 (see Fig. 2). The flanges 83 and 84 are axially slidable on but attached for driving engagement with shafts 87 and 88. Flanges 85 and 86 are rigidly attached to shafts 87 and 88 and form fixed sides of annular V-shaped grooves in conjunction with flanges 83 and 84. Shafts 87 and 88 carry rigidly mounted pinions 89 and 90 which mesh with gears 91 and 92 rigidly connected to internally splined sleeves 93 and 94, which are suitably journalled for rotation. Rotation of the sleeves 93 and 94 causes rotation of the drive shafts 17 for the endless propelling members 16. The shafts 17 are slidable axially in the bores of sleeves 93 and 94 and have suitable driving engagement therewith. This may be effected by the use of splines, hexagonal cross-sections or in any other suitable manner.

When force is exerted in a spreading direction, the outer disks of the sheaves 82 or 83 may yield axially as is indicated by the sheave 82 in Fig. 2. Such spreading action compresses a coiled spring 97 contained within the hub, as is well known in this type of sheave, and the spring is used to return the movable disk to its former position after the spreading force is no longer acting. The sheave 81 is connected to the sheave 67 by the endless belt 79 and the sheave 82 is connected to the sheave 68 by the endless belt 80. When the sides of one of the sheaves 67 or 68 are close together, as is indicated by the sheave 68 of Figs. 2 and 3, the effective diameter for the purpose of engaging and driving the belt 80 will be increased so that the engagement of the belt with the sheave will take place a substantial distance radially outwardly of the hub, and belt 80 will have a comparatively high speed. When this condition occurs, the sheave 82 will be spread by the force of the endless belt against the tension of the spring 97 to reduce the effective belt engaging diameter and correspondingly increase the speed of the sheave 82. While this is taking place on one side of the tractor, a reverse action may take place between the sheaves on the opposite side, as is illustrated in Fig. 2. Thus the speed ratio between the sheaves 68 and 82 may be infinitely varied with a reverse variation taking place between the sheaves 67 and 81. If desired, however, as will be hereinafter explained, the effective diameters of the sheaves 68 and 67 may be varied correspondingly rather than reversely, depending upon the particular requirements. When the sheaves on the two sides are caused to act in a reverse manner from one another, a positive drive type of steering is obtained. In addition to use for steering, corresponding changes in the effective diameters of the sheaves 67 and 68 may be used to obtain an additional speed variation over that provided for by the transmission gears in the case 21 as will be hereinafter explained more fully.

The steering controls

Projecting from the top of the tractor is a vertical tube 97. Rotatable within the tube 97 is a tube 98 having a bevel gear 99 rigidly attached to its lower end (see Fig. 3). Rotatably supported within the tube 98 for independent rotation is a shaft 100 having a pinion 101 rigidly connected to its lower end. The bevel gear 99 engages bevel pinions 102 and 103. Meshing with the pinion 101 is a bevel gear 104.

The bevel pinion 102 is in splined connection with a collar 105 and the bevel pinion 103 is in splined connection with a collar 106. The bore of the collar 105 has lefthand threading which cooperates with threading on a screw 107. The bore of the collar 106 is formed with righthand threading which cooperates with threading on the opposite end of the screw 107. The gear 99 is fixed to the sleeve 98 which is rotatable in the tube 97.

When the gear 99 is rotated in a clockwise direction from above, it will cause the gears 102 and 103 to rotate in opposite directions, thus causing the collars 105 and 106 to rotate on the threads of the pin 107, if the screw 107 is held stationary. This movement may be continued until the collar 105 has been moved axially inwardly to its extreme limit and until the collar 106 has been moved axially outwardly to its extreme limit, as is illustrated in Fig. 3. In either direction of rotation of the gear 99, the collars will move a like amount in the same direction if the screw 107 is held stationary.

Movement of the collars 105 and 106 will act through yokes 105'—106' having suitable trunnions in the upper ends of levers 108 and 109 to cause pivotal movement of said levers on pivots 110 and 111. The levers 108 and 109 are in the form of forks and have forked lower ends which bear against thrust bearings interposed between said lower ends and the movable sleeves 73 and 74 of the sheaves 67 and 68. Thus with the movement of the collars 105 and 106, illustrated in Fig. 3, motion will be transmitted to the sheaves by the levers 108 and 109 to cause the effective diameter of the sheave 68 to be increased as desired and to cause the effective diameter of the sheave 67 to be decreased as desired or vice versa as the case may be.

The gear 104 is pinned to the center of the screw 107. Thus, when the shaft 100 is stationary, the pinion 101 will serve to hold the screw 107 against rotation while the collars 105 and 106 are being actuated in the manner heretofore described.

Speed control

If, however, the hand wheel 112 is rotated, it will act through pinion 101 and gear 104 to rotate the screw 107 and force the collars 105 and 106 to be moved simultaneously outwardly in opposite directions from each other or simultaneously inwardly toward each other depending upon the direction of rotation of the hand wheel 112. Thus, the hand wheel 112 may be used to cause a simultaneous increase or decrease in the speed of the belts 79 and 80, and this increase or decrease may take place either independently of or simultaneously with a steering operation.

The reversing mechanism

Figure 6:
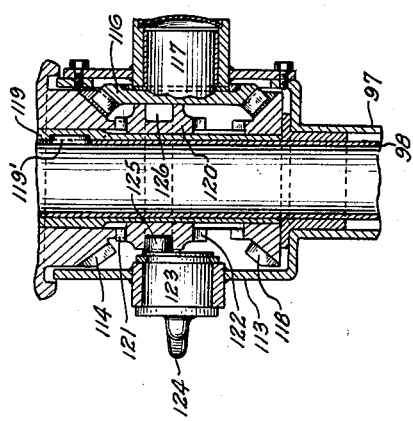

Referring to Figs. 3 and 6, at the upper end of the tube 97 there is a tubular housing 113. Within this housing is a top bevel gear 114 which is integral with a hand wheel 115. The gear 114 meshes with a side bevel gear 116 which is mounted on the end of a rotatable stud 117. The bevel gear 116 also meshes with a bottom bevel gear 118. The gear 114 is rotatable with the hand wheel 115 around a sleeve 119. The sleeve 119 is keyed by key 119' to the tube 98. The sleeve 119 also has external splines which engage internal axial splines of a shiftable collar 120. Said collar has jaw clutches 121 at its upper end which are engageable with cooperating jaw clutches projecting from the hub for the gear 114. The bottom of the collar is formed with jaw clutches 122 which are engageable with cooperating jaw clutches on a hub for the gear 118. A cylinder 123, which may be rotated by manipulation of a handle 124, causes movement of an eccentric pin 125. The latter is engageable with a peripheral groove 126 of the collar 120.

It is clear that rotation of the pin 123 will cause shifting of the collar from the position shown in Fig. 3 where the jaws 121 are in engagement to an opposite position wherein the jaws 122 are effectively engaged. In the position shown in Fig. 3 there is a direct drive from the hand wheel 115 through the shiftable collar 120 and sleeves 119 and 98 with the gear 99. When the collar 120 is in a lowered position, then the drive from the hand wheel 115 passes through the gears 116 and 118, through the collar 120, sleeve 119 and sleeve 98 to the gear 99. This causes rotation of the gear 99 in a reverse direction.

The driver's seat

Surrounding the lower end of the tube 97 and connected to the top of the tractor is a circular flange 126 (see Fig. 3). The lower portion of the flange at its periphery is undercut, as at 127, to provide a bottom portion 128 of reduced diameter around which a plate 129 is rotatable. Rigidly secured to the plate 129 is a driver's seat 130. It is clear from Figs. 1 and 3 that the seat may be readily shifted by rotating its base plate 180° from the full line position of Fig. 1 to the dot and dash line position therein. Due to the use of the reversing mechanism, previously described, the hand wheel 115 may be used to effect steering with equal facility regardless of whether the seat is in the full line position of Fig. 1 for driving in one direction, or in the dot and dash line position for driving in the opposite direction.

The braking mechanism

Integral with the gears 102 and 103 (see Fig. 3) are spur gears 131 and 132. These gears engage gears 133 and 134 which are rotatable with independently rotatable gears 135 and 136. The two units comprising the gears 133—135 and 134—136 are rotatable on a pin 136'.

The gears 135 and 136 are engageable with gears 137 and 138 respectively. The gear 137 is rigidly connected to a shaft 139, and the gear 138 is rigidly connected to an independent shaft 140 which is in axial alinement with the shaft 139. The arrangement is such that there is a reduction of approximately four to one between the steering wheel 115 and the shafts 139 and 140.

Fixed to reduced end portions of the shafts 139 and 140 are collars 141 and 142 having radially projecting fingers 143 and 144. Rotatable on the collars 141 and 142 are sprocket wheels 145 and 146 having axially projecting lugs 147 and 148 respectively. The lugs 147 and 148 are so positioned that they are adapted to be engaged by the fingers 143 and 144. Normally, the fingers 143 and 144 are located 180° from the lugs 147 and 148.

Co-acting with the sprocket wheels 145 and 146 are chains 149 and 150 (see Figs. 1 and 2). One end of the chain 149 is connected by a rod 151 with a pivoted pin 152 at the lower end of a brake actuating lever 153. The lever 153 actuates a brake band 154 which acts on a brake drum 155 connected to and rotatable with the sheave 81. The other end of the chain 149 is connected by a rod 156 with a lever 157. The latter is rigidly connected to a shaft 158 which is adapted to be rocked by a brake pedal 159 (see Fig. 2). In the same manner the sprocket chain 150 on the opposite side is connected by a rod 160 with braking mechanism for the sheave 82 and by a rod 161 with the mechanism controlled by the foot brake pedal 162.

Operation of either foot pedal 159 or 162 will impose a braking force on the selected side to help the tractor during steering. If both of the brake pedals are depressed simultaneously, they may be used as brakes to stop the tractor. The fact that the sprocket wheels 145 and 146 rotate freely on the collars 141 and 142 permits this normal braking action whenever it is required.

Whenever the steering wheel 115 is rotated, this will, through the mechanism heretofore described, cause partial rotation of the collars 141 and 142 in opposite directions. As steering is continued to the extreme condition shown in Fig. 3, assuming that the tractor is moving in a forward direction, with the engine in front and with the seat in the dot and dash line position of Fig. 1, the tractor will start to turn to the right due to the action on the variable sheaves 67 and 68. However, at the same time, the collar 141 will rotate to a position where the finger 143 will contact the sprocket wheel lug 147. This causes rotation of the sprocket wheel 149 and a braking of the propelling unit 16 on the right hand side. The reversely rotating collar 142 will have its finger 144 contact the lug 148 on the sprocket wheel 146 to release the brake on the left hand side. Thus, the steering wheel 115 is capable of locking the brake 154 at the same time that it releases the variable sheave 67. Thus, the tractor will make an extremely short turn, and, when operating under heavy drawbar conditions where it is necessary to maintain maximum power output by use of the foot on the foot throttle, a pivoting turn under full power may be accomplished by cooperative action of the steering wheel and the throttle.

In making a turn in the reverse direction, the opposite action takes place.

Summary of operation

Referring to Figs. 1 and 2, with the engine in front, the seat 130 is swung to the dot and dash line position. Using the control mechanism as is illustrated by the position shown in Figs. 3 and 6, then the steering wheel 115 may be operated to steer the vehicle by turning in the conventional directions. Such steering will be accomplished by the controlled action of the sheaves 67 and 68, as in Fig. 3, for turning right. For turning left, the sheaves are in the reverse condition from Fig. 3. When abrupt turns are being made, the brake on one side or the other will be automatically applied to facilitate the steering action and to make the turn more sharp. During such steering the hand wheel 112 may be rotated in one direction or the other to simultaneously increase or decrease the speed of the propelling members. Also, the hand wheel 112 may be used while driving straight to effect an increase or decrease in speed over and above that which may be obtained by operation of the change-speed gearing.

During operation, the two brake pedals may be manipulated simultaneously to stop or slow up the tractor, and this may be accomplished without in any way interfering with the automatic action of the brakes for steering purposes. At any time desired, one or other of the brake pedals 159 or 162 may be depressed by the operator to aid the steering action.

The lever 54 may be manipulated to shift the gear 27 in the transmission case as heretofore explained in connection with Fig. 4, and said lever may also be manipulated to control the direction of travel.

If it is desired to operate the tractor in the opposite direction from that just described, with the engine in the rear, then the seat 130 is turned to the full line position of Fig. 1. This direction of operation is desirable for better visibility of work when operating front mounted implements such as row crop cultivators, mowers, or corn pickers. This direction of operation is also desirable because of improved stability provided when additional front end loads are to carried, such as tractor sweep rakes, manure loaders and the like.

With the seat in the full line position of Fig. 1, the reversing mechanism control 124 is manipulated to lower the collar 120 from its position in Fig. 3 into clutching engagement with the gear 118. This reverses the direction of application of steering movements so that the hand wheel 115 may again be operated in conventional steering directions regardless of the shifted position of the seat. In addition, the hand lever 54 must be manipulated to reverse the direction of drive from the engine. The hand wheel 112 may be used to increase or decrease the speed in the same manner as heretofore described, and the foot pedals may be actuated for braking or for steering purposes. The foot pedals 159 and 162, and the shifting lever 54 and clutch throwout lever 54' are so located that they are equally convenient in either position of the seat 130.

Various changes and modifications may be made without departing from the spirit of the invention, and all of such changes are contemplated as may come within the scope of the claims.

What is claimed as the invention is:

1. In a vehicle having a pair of spaced propelling members, an engine, a reversible driving connection between said engine and both of said propelling members, a manually operable steering control, a pair of belt connected adjustable variable speed sheaves in the driving connection for each of said propelling members, screw means responsive to movement of said manual control for causing reverse adjustment of the pair of sheaves on one side with respect to the pair of sheaves on the other side to inversely vary the speed of the two propelling members to cause steering of the vehicle, a brake for each propelling member having an operating lever, a sprocket chain connected at one end to the lever for each brake, a freely rotatably mounted sprocket wheel around which a portion of each chain is directed, a foot pedal connected to the opposite end of each chain, and means rotatable with said screw means and engageable with one of said sprocket wheels for causing partial rotation thereof and actuation of one of said brakes to augment a steering action.

2. In a vehicle having a pair of spaced propelling members, an engine, a reversible driving connection between said engine and both of said propelling members, a manually operable steering control, a pair of belt connected adjustable variable speed sheaves in the drive connection for each of said propelling members, screw means responsive to movement of said manual control for causing reverse adjustment of the pair of sheaves on one side with respect to the pair of sheaves on the other side to inversely vary the speed of the two propelling members to cause steering of the vehicle, a brake for each propelling member having an operating lever, an elongated flexible actuating member connected to the lever for each brake, a freely rotatably mounted wheel around which a portion of each flexible actuating member is directed, each wheel having a projecting lug, and means rotatable with said screw means and including projecting fingers positioned to engage said lugs to cause partial rotation of said wheels and actuation of said brakes to augment steering action.

3. In a vehicle having a pair of spaced propelling members, an engine, a driving connection between the engine and both of said propelling members, a pair of belt connected adjustable variable speed sheaves in the drive for each propelling member, a first manual control on the vehicle, screw means responsive to movement of said first manual control for causing reverse adjustment of the pair of sheaves on one side with respect to the pair of sheaves on the other side to inversely vary the speed of the two propelling members and cause steering of the vehicle, a second manual control on the vehicle, and said screw means being responsive to movement of said second manual control for causing a like adjustment of the sheaves of both pairs simultaneously to increase or decrease the speed of the vehicle.

4. In a vehicle having a pair of spaced propelling members, an engine, a driving connection between the engine and both of said propelling members, a pair of belt connected sheaves having V grooves in the drive for each propelling member, adjustably movable sides for said sheaves to vary the width of the V grooves, levers for moving the sides of certain of said sheaves to vary the speed of the drive for said propelling members, lever actuating members engaging said levers, a screw having reversely threaded ends in threaded engagement with said actuating members for moving said actuating members simultaneously to cause like adjustment of the sheaves of both pairs, manual means for rotating said screw to effect said above-mentioned like adjustment, and manual means for rotating said actuating members on said screw ends to cause reverse adjustment of the sheaves of one pair with repect to the sheaves of the other pair.

5. In a vehicle having a pair of spaced propelling members, an engine, a transverse shaft driven by said engine, a pair of spaced sheaves on said shaft and continuously driven thereby when the shaft is rotating, each sheave having a V groove and having a side portion movable to vary the width of said groove, levers for moving the movable sides of said sheaves, lever actuating members engaging said levers, a screw having reversely threaded ends in threaded engagement with said actuating members for moving said actuating members simultaneously to cause like adjustment of both sheaves, manual means for rotating said screw to effect said above-mentioned like adjustment, manual means for rotating said actuating members on said screw ends to cause reverse adjustment of one sheave with respect to the other sheave, a sheave having a V groove for driving each propelling member, each of said last-mentioned sheaves having a movable side, yielding means normally urging said movable sides toward the other sides of the sheaves, an endless V belt connecting one of the first-mentioned sheaves with the driving sheave for one of said propelling members, and an endless V belt connecting the other of said first-mentioned sheaves with the driving sheave for the other propelling member.

6. In a vehicle having a pair of spaced propelling members, an engine, a reversible driving connection between said engine and both of said propelling members, a manually operable steering control, a pair of belt connected adjustable variable speed sheaves in the drive connection for each of said propelling members, actuating means responsive to movement of said manual control for causing reverse adjustment of the pair of sheaves on one side with respect to the pair of sheaves on the other side to inversely vary the speed of the two propelling members to cause steering of the vehicle, a brake for each propelling member having an operating lever, a sprocket chain connected to the lever for each brake, a freely rotatably mounted sprocket wheel around which a portion of each chain is directed, and means rotatable with said actuating means and engageable with one of said sprocket wheels for causing partial rotation thereof and actuation of the brake on the propelling member whose speed is reduced by said actuating means to augment the steering action.

7. In a vehicle having a pair of spaced propelling members, an engine, a reversible driving connection between said engine and both of said propelling members, a manually operable steering control, a pair of belt connected adjustable variable speed sheaves in the driving connection for each of said propelling members, actuating means responsive to movement of said manual control for causing reverse adjustment of the pair of sheaves on one side with respect to the pair of sheaves on the other side to inversely vary the speed of the two propelling members to cause steering of the vehicle, a brake for each propelling member having an operating lever, a sprocket chain connected at one end to the lever for each brake, a freely rotatably mounted sprocket wheel around which a portion of each chain is directed, a foot pedal connected to the opposite end of each chain, and means rotatable with said actuating means and engageable with one of said sprocket wheels for causing partial rotation thereof and actuation of one of said brakes to augment a steering action.

8. In a vehicle having a pair of spaced propelling members, an engine, a reversible driving connection between said engine and both of said propelling members, a manually operable steering control, a pair of belt connected adjustable variable speed sheaves in the driving connection, for each of said propelling members, actuating means responsive to movement of said manual control for causing reverse adjustment of the pair of sheaves on one side with respect to the pair of sheaves on the other side to inversely vary the speed of the two propelling members to cause steering of the vehicle, a brake for each propelling member having an operating lever, an elongated flexible actuating member connected to the lever for each brake, a freely rotatably mounted wheel around which a portion of each flexible actuating member is directed, each wheel having a projecting lug, and means rotatable with said actuating means and including projecting fingers positioned to engage said lugs to cause partial rotation of said wheels and actuation of said brakes to augment steering action.

9. In a vehicle having a pair of spaced propelling members, an engine, a driving connection between the engine and both of said propelling members, a pair of belt connected adjustable variable speed sheaves in the drive for each propelling member, a first manual control on the vehicle, actuating means responsive to movement of said first manual control for causing reverse adjustment of the pair of sheaves on one side with respect to the pair of sheaves on the other side to inversely vary the speed of the two propelling members and cause steering of the vehicle, a second manual control on the vehicle, and said actuating means being responsive to movement of said second manual control for causing a like adjustment of the sheaves of both pairs simultaneously to increase or decrease the speed of the vehicle.

10. In a vehicle having a pair of spaced propelling members: an engine; a reversible drive connection between said engine and both of said propelling members; a manually operable steering control; a pair of belt connected adjustable variable speed sheaves in the drive connection for each of said propelling members; screw means responsive to movement of said manual control for causing reverse adjustment of the pair of sheaves on one side with respect to the pair of sheaves on the other side to inversely vary the speed of the two propelling members a selected amount within a given range to cause steering of the vehicle; a brake for each propelling member; and means rotatable with said screw means during steering for actuating one of said brakes to augment the steering action.

11. In a vehicle having a pair of spaced propelling members, an engine, and a reversible driving connection between said engine and both of said propelling members: a manually operable steering control; a pair of belt connected adjustable variable speed sheaves in the drive connection for each of said propelling members; screw means responsive to movement of said manual control for causing reverse adjustment of the pair of sheaves on one side with respect to the pair of sheaves on the other side to inversely vary the speed of the two propelling members to cause steering of the vehicle; a brake for each propelling member and having an operating lever; an elongated flexible member connected to the lever for each brake; a freely rotatably mounted member for each of said flexible members and around which a portion of each of said flexible members is directed; and means rotatable with said screw means and engageable with one of said rotatable members for causing partial rotation thereof and actuation of one of said brakes to augment the steering action.

12. In a vehicle having a pair of spaced propelling members, an engine, a reversible driving connection between said engine and both of said propelling members, a manually operable steering control, a pair of belt connected adjustable variable speed sheaves in the drive connection for each of said propelling members, screw means responsive to movement of said manual control for causing reverse adjustment of the pair of sheaves on one side with respect to the pair of sheaves on the other side to inversely vary the speed of the two propelling members to cause steering of the vehicle, a brake for each propelling member having an operating lever, a sprocket chain connected to the lever for each brake, a freely rotatably mounted sprocket wheel around which a portion of each chain is directed, and means rotatable with said screw means and engageable with one of said sprocket wheels for causing partial rotation thereof and actuation of one of said brakes to augment the steering action.

13. In a vehicle having a pair of spaced propelling members, an engine, a reversible driving connection between said engine and both of said propelling members, a manually operable steering control, a pair of belt connected adjustable variable speed sheaves in the drive connection for each of said propelling members, screw means responsive to movement of said manual control for causing reverse adjustment of the pair of sheaves on one side with respect to the pair of sheaves on the other side to inversely vary the speed of the two propelling members to cause steering of the vehicle, a brake for each propelling member having an operating lever, a sprocket chain connected to the lever for each brake, a freely rotatably mounted sprocket wheel around which a portion of each chain is directed, and means rotatable with said screw means and engageable with one of said sprocket wheels for causing partial rotation thereof and actuation of the brake on the propelling member whose speed is reduced by the actuating means, to augment the steering action.

14. In a vehicle having a pair of spaced propelling members: an engine; a drive connection between said engine and both of said propelling members; a manually operable steering control normally in neutral position mounted for movement away from neutral position; a pair of belt connected adjustable variable speed sheaves in the drive connection for each of said propelling members; and actuating mechanism connected to said steering control and to both of said pairs of sheaves in a manner to cause reverse adjustment of one pair of sheaves with respect to the other pair of sheaves in response to movement of said steering control away from neutral position to inversely vary the speed of the two propelling members and cause steering of the vehicle.

15. In a vehicle having a pair of spaced propelling members: an engine, a drive connection between said engine and both of said propelling members; a manually operable steering control normally in neutral position mounted for movement in either of two directions; a pair of belt connected adjustable variable speed sheaves in the drive connection for each of said propelling members; and actuating mechanism connected to said steering control and to both of said pairs of sheaves in a manner to cause reverse adjustment of one pair of sheaves with respect to the other pair of sheaves in response to movement of the steering control in one of said directions away from neutral position to cause speeding up of one of the propelling members and simultaneous slowing down of the other propelling member and cause turning of the vehicle in one direction, said actuating mechanism also being connected to the steering control and to both pairs of sheaves in such a manner that movement of the steering control in the other direction causes adjustment of all of the sheaves oppositely to the adjustment caused by movement of the steering control in the first-mentioned direction to cause slowing down of the first-mentioned propelling member and simultaneous speeding up of the other propelling member and turning of the vehicle in the opposite direction.

GEORGE W. CURTIS.

REFERENCES CITED

The following references are of record in the file of this patent:

UNITED STATES PATENTS

| Number | Name | Date |
|---|---|---|
| 1,012,841 | Gray | Dec. 26, 1911 |
| 1,127,629 | Johnson et al. | Feb. 9, 1915 |
| 1,278,256 | Thompson | Sept. 10, 1918 |
| 1,641,813 | Johnston et al. | Sept. 6, 1927 |
| 1,677,878 | Leake | July 17, 1928 |
| 2,159,983 | Colby | May 30, 1939 |

FOREIGN PATENTS

| Number | Country | Date |
|---|---|---|
| 19,029 | Great Britain | A. D. 1895 |
| 5,447 | Great Britain | Mar. 3, 1914 |